Patented Nov. 5, 1940

2,220,681

UNITED STATES PATENT OFFICE 2,220,681

NONAQUEOUS DRILLING FLUIDS

Philippus Henderikus Huisman, Pangkalan Brandan, Dutch East Indies, assignor to Shell Development Company, San Francisco, Calif., a corporation of Delaware No Drawing. Application May 23, 1939, Serial No. 275,182. In the Netherlands June 2, 1938

3 Claims. (Cl. 255—1)

This invention relates to improvements in nonaqueous drilling fluids for use in drilling wells. More particularly it relates to the use of stabilizing agents in oil base drilling fluids containing weighting materials which have a tendency to settle out.

In the art of drilling wells for oil or gas by the rotary method, ordinarily a fluid composed of a suspension of clay in water is pumped down the drill pipe through the drill bit in order to wash to the surface the particles of earth cut by the bit. During drilling, heaving shale formations are frequently encountered which swell and disintegrate on contact with water and cave into the hole. Often this movement of shale freezes or sticks the drill pipe and bit, making it difficult or impossible to remove these tools from the hole. As it is sometimes impossible to penetrate these shale formations by ordinary methods of drilling which use water-base mudflushes, it has been previously proposed to use a drilling fluid composed of a suspension in a nonaqueous medium, such as oil, of ground weighting materials such as finely divided hematite, galenite, barytes, silica, ground oyster shells, etc. Ordinarily, weighting materials in nonaqueous suspensions have an excessive tendency toward sedimentation and to overcome this deficiency of nonaqueous drilling fluids, slaked lime and other alkaline substances have been proposed as stabilizing agents. However, such alkaline stabilizing agents are often unsatisfactory and fail to prevent sedimentation of weighting material in drilling fluids, especially in fluids of relatively high or relatively low specific gravities, that is, in fluids containing relatively high or relatively low amounts of inert weighting materials.

It is therefore an object of this invention to provide an improved drilling fluid which is stable both at relatively high specific gravity and at relatively low specific gravity and which comprises as a stabilizing agent or sedimentation inhibitor voluminous magnesium oxide or carbonate.

Voluminous magnesium oxide may, for example, be prepared by burning or calcining magnesium carbonate. It is understood that only those varieties of magnesium carbonate which are of the voluminous or fluffy type are suitable for preparation of nonaqueous drilling fluids according to the present invention. These sedimentation inhibitors, namely voluminous magnesium oxide and carbonate, impart thixotropic properties to nonaqueous drilling fluids, and make it not only possible, according to the present invention, to prepare drilling fluids which are very stable, but the amount of weighting material can also be raised to such an extent as to produce drilling fluids of high specific gravity such as 3, 3.5 or higher. For example, a drilling fluid having a specific gravity of 3.5 and consisting of 85 parts by weight galenite and 15 parts by weight of crude oil topped to 200° C. formed a highly solid sediment after standing one-half hour. On addition of 3 parts by weight of voluminous magnesium oxide to a drilling fluid of the same composition, no appreciable sedimentation occurred after 24 hours' standing. Such high specific gravity muds are eminently suitable for use in formations in which high pressures occur.

Another particular advantage of nonaqueous drilling fluids containing voluminous magnesium oxide or carbonate is that these drilling fluids are not affected to any appreciable extent by high temperatures occurring within deep wells. Nor does dilution with water increase the rate of sedimentation of weighting materials in the drilling fluids prepared according to this invention.

By using voluminous magnesium oxide or carbonate, it is possible to prepare, in addition to highly stable drilling fluids of high specific gravity, also drilling fluids which are stable and have relatively low specific gravities, such as, for example, 1.75, 1.5 or lower. Previously it had not been possible to prepare a nonaqueous drilling fluid containing a relatively small amount of weighting fluid without it showing an excessive tendency towards sedimentation. For example, a drilling fluid with a specific gravity of 1.5 consisting of 38 parts by weight of galenite (passed through a 325 mesh sieve-A. S. T. M.) and 48.8 parts by weight crude oil topped to 200° C. yielded a solid sediment after standing 24 hours. But on addition of 13.2 parts by weight of voluminous magnesium oxide to a drilling fluid of the same composition, a homogeneous suspension was maintained.

In the normal specific gravity range of nonaqueous drilling fluids, suspensions prepared with voluminous magnesium oxide or carbonate show less tendency toward sedimentation than do similar suspensions stabilized with slaked lime and like substances. For instance, a drilling fluid with a specific gravity of 2.5, consisting of 71 parts by weight galenite and 29 parts by weight crude oil topped to 200° C. yielded a solid sediment after standing 24 hours. Upon adding 4 parts by weight of lime to the fluid of this composition, a solid sediment was also formed in the same time. However, a homogeneous suspension was maintained after adding to the fluid 4 parts by weight of voluminous magnesium oxide.

In general, the sedimentation inhibitors may be used in quantities from 1% to 20% based on the weight of the drilling fluid, although greater or lesser amounts may be used, depending on the amount, density, and kind of the material suspended in the fluid and other requirements such as may be particular to each drilling fluid or application.

Other finely divided solids of voluminous or foraminate or fluffy character and capable of imparting thixotropic properties to nonaqueous drilling fluids may be used. Thus, although voluminous magnesium carbonate or oxide are preferable due to the superior nature of drilling fluids prepared with them, certain types of carbon black and lampblack, such as, for example, the product known as "short" carbon black to the printers' ink trade, may likewise be used if availability and economy warrant their use.

I claim as my invention:

1. A drilling fluid comprising a mineral oil, a weighting material, and voluminous magnesium carbonate as a sedimentation inhibitor.

2. A drilling fluid comprising a mineral oil, a weighting material, and voluminous magnesium oxide as a sedimentation inhibitor.

3. In drilling a well the step of circulating therein a drilling fluid comprising a mineral oil, a finely comminuted solid material dispersed therein, and a sedimentation inhibitor selected from the group consisting of voluminous magnesium oxide and carbonate.

PHILIPPUS HENDERIKUS HUISMAN.